(12) United States Patent
Fortin

(10) Patent No.: US 12,194,819 B2
(45) Date of Patent: Jan. 14, 2025

(54) DOOR MODULE

(71) Applicant: MAGNA CLOSURES INC., Newmarket (CA)

(72) Inventor: Raymond Edward Fortin, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 296 days.

(21) Appl. No.: 17/571,314

(22) Filed: Jan. 7, 2022

(65) Prior Publication Data

US 2022/0219513 A1 Jul. 14, 2022

Related U.S. Application Data

(60) Provisional application No. 63/141,936, filed on Jan. 26, 2021, provisional application No. 63/135,010, filed on Jan. 8, 2021.

(51) Int. Cl.
*B60J 5/04* (2006.01)
*E05B 85/16* (2014.01)

(52) U.S. Cl.
CPC ............. *B60J 5/0416* (2013.01); *E05B 85/16* (2013.01)

(58) Field of Classification Search
CPC ........ B60J 5/0412; B60J 5/042; B60J 5/0416; E05B 85/14; E05B 85/16; E05B 85/18
USPC ...................................................... 292/336.3
See application file for complete search history.

(56) References Cited

U.S. PATENT DOCUMENTS

| | | |
|---|---|---|
| 6,536,164 B1 | 3/2003 | Kirejczyk |
| 6,796,085 B2 | 9/2004 | Smith |
| 6,862,846 B1 | 3/2005 | Kirejczyk |
| 6,918,209 B2 | 7/2005 | Regnier et al. |
| 6,979,047 B2 | 12/2005 | Lin et al. |
| 7,192,076 B2 | 3/2007 | Ottino |
| 7,424,788 B2 | 9/2008 | Kirejczyk |
| 7,596,908 B2 | 10/2009 | Rothe et al. |
| 7,607,716 B2 | 10/2009 | Buchta et al. |
| 7,610,720 B2 | 11/2009 | Kirejczyk et al. |
| 7,669,501 B2 | 3/2010 | Rothe |
| 7,891,138 B2 | 2/2011 | Ottino |
| 7,992,347 B2 | 8/2011 | Roy et al. |
| 8,020,919 B2 | 9/2011 | Lin et al. |
| 8,096,080 B2 | 1/2012 | Pavlovic et al. |
| 8,136,866 B2 | 3/2012 | Broadhead |
| 8,631,607 B2 | 1/2014 | Broadhead et al. |
| 8,763,308 B2 | 7/2014 | Roy et al. |
| 8,935,886 B2 | 1/2015 | Pavlovic et al. |
| 8,966,820 B2 | 3/2015 | Broadhead et al. |
| 9,126,470 B2 | 9/2015 | Kaliomaki et al. |
| 9,132,721 B2* | 9/2015 | Fortin ............... B60J 5/0418 |
| 9,243,657 B2 | 1/2016 | McCorkell |
| 9,353,556 B2 | 5/2016 | Margheritti et al. |
| 9,731,581 B2 | 8/2017 | Fortin et al. |

(Continued)

FOREIGN PATENT DOCUMENTS

EP 2072301 A1 * 6/2009 ............ B60J 5/0412

*Primary Examiner* — Eugene G Byrd
*Assistant Examiner* — James Edward Ignaczewski
(74) *Attorney, Agent, or Firm* — Dickinson Wright PLLC

(57) ABSTRACT

A door module and presenter assembly therefor, the door module having a carrier module, a handle chassis, an extension member extending from the carrier module to support the handle chassis, wherein the handle chassis is moveable relative to the carrier module.

8 Claims, 15 Drawing Sheets

(56) References Cited

U.S. PATENT DOCUMENTS

| | | |
|---|---|---|
| 10,287,814 B2 | 5/2019 | Fortin |
| 10,647,183 B2 | 5/2020 | Magazzini et al. |
| 10,669,764 B2 | 6/2020 | Fortin |
| 10,676,975 B2 | 6/2020 | Fortin et al. |
| 10,953,731 B2 | 3/2021 | Fortin et al. |
| 11,001,128 B2 | 5/2021 | Fortin |
| 11,124,051 B2 | 9/2021 | Grella |
| 11,125,002 B2 | 9/2021 | Pavlovic et al. |
| 11,427,055 B2 * | 8/2022 | McGuire ................ E05B 79/04 |
| 2004/0084930 A1 | 5/2004 | Lin |
| 2004/0128917 A1 | 7/2004 | Lin |
| 2005/0115155 A1 | 6/2005 | Ottino et al. |
| 2005/0218693 A1 * | 10/2005 | Carter ................ B60J 5/0416 |
| | | 296/146.1 |
| 2005/0274079 A1 | 12/2005 | Ottino et al. |
| 2006/0191206 A1 | 8/2006 | Mooney et al. |
| 2006/0272219 A1 * | 12/2006 | Carter ................ E05B 79/06 |
| | | 49/503 |
| 2007/0001477 A1 * | 1/2007 | Syed ................ B60J 5/0416 |
| | | 296/146.7 |
| 2008/0022601 A1 | 1/2008 | Smith |
| 2012/0125399 A1 | 5/2012 | Schatz et al. |
| 2015/0096237 A1 | 4/2015 | Pavlovic et al. |
| 2015/0197140 A1 | 7/2015 | Broadhead et al. |
| 2016/0001642 A1 | 1/2016 | Fortin |
| 2018/0354349 A1 * | 12/2018 | Fortin ................ B60J 5/0418 |
| 2019/0092145 A1 * | 3/2019 | Walawender ......... B60J 5/0416 |
| 2019/0241055 A1 | 8/2019 | Magazzini |
| 2019/0291544 A1 | 9/2019 | Fortin |
| 2020/0171926 A1 | 6/2020 | Fortin |
| 2021/0300161 A1 | 9/2021 | Fortin |

\* cited by examiner

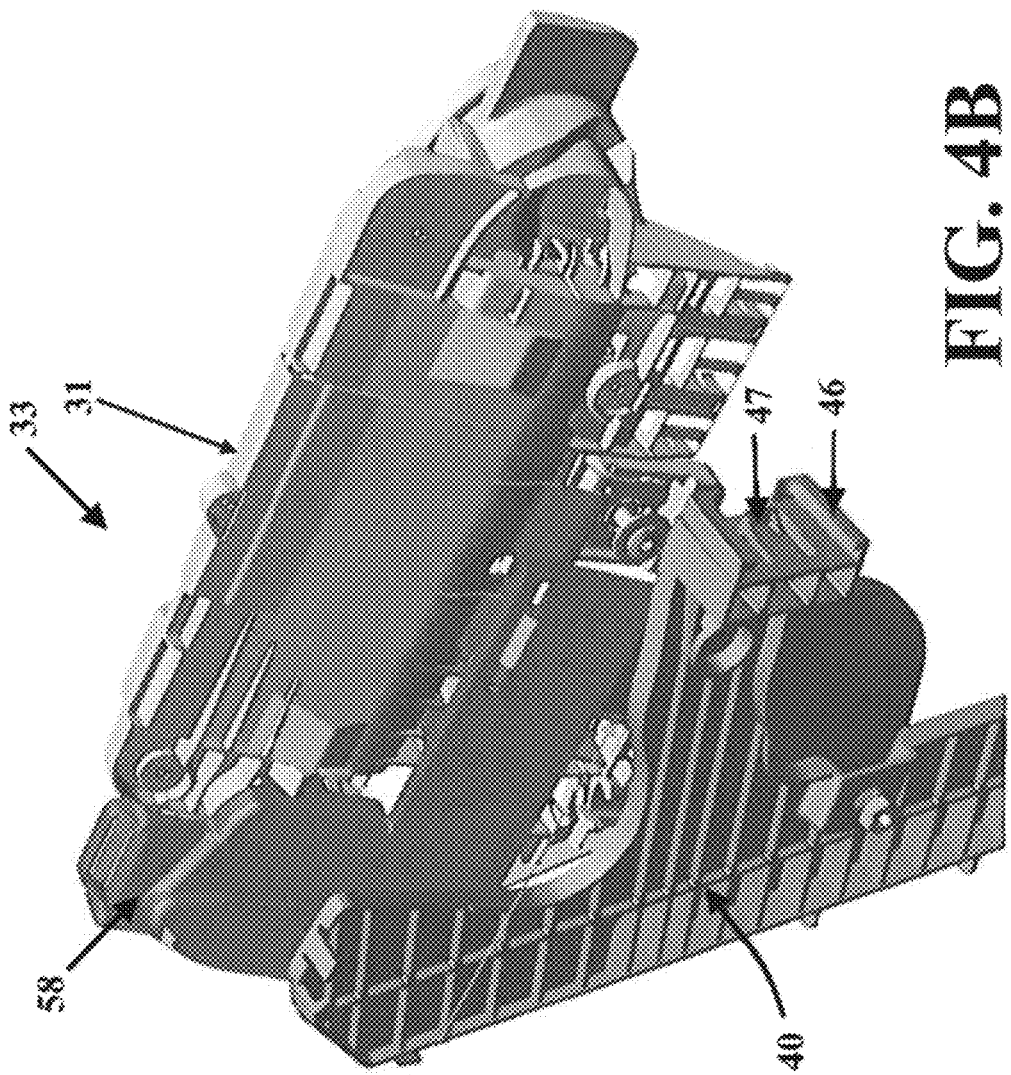

DOOR MODULE

CROSS-REFERENCE TO RELATED APPLICATION

This application claims the benefit of U.S. Provisional Application Ser. No. 63/141,936, filed Jan. 26, 2021, and the benefit of U.S. Provisional Application Ser. No. 63/135,010, filed Jan. 8, 2021, which are both incorporated herein by way of reference in their entirety.

FIELD

The present disclosure relates to door modules of the type installed in doors associated with motor vehicles, and more particularly, to door modules having an outside handle assembly fixed thereto.

BACKGROUND

This section provides background information related to the present disclosure which is not necessarily prior art.

It is known to install pre-assembled door modules within the interior of a closure assembly associated with a motor vehicle. It is further known to fix an outside door handle assembly and a latch assembly to a mount member, sometimes referred to as presenter, of the pre-assembled door modules in advance of assembling the pre-assembled door module to the closure assembly of the motor vehicle. Unfortunately, complications can arise when assembling pre-assembled door modules to closure assemblies due to misalignment of components fixed to the pre-assembled door modules with associated mount locations of the closure assemblies, such as providing desired alignment of a carrier of the pre-assembled door modules, while at the same time providing desired alignment of the outside door handle assembly and latch assembly with associated mount locations of the closure assembly.

In view of the above, there is a need to provide a pre-assembled door module and a latch/outside handle subassembly therefor, wherein the latch/outside handle subassembly allows a latch assembly and outside handle assembly of the pre-assembled door module to be readily aligned with respective mount locations of the closure assembly, such that the pre-assembled door module enhances economies of manufacture and assembly of the closure assembly, while at the same time optimizing functionality of the latch assembly, the outside door handle assembly and other features associated with the pre-assembled door module.

SUMMARY

This section provides a general summary of the disclosure, and is not a comprehensive disclosure of its full scope or all of its features.

It is an object of the present disclosure to provide a door module that overcomes at least the complications presented by known door modules discussed above.

It is an aspect of the present disclosure to provide a door module that embodies the inventive concepts set forth in the following illustrations.

It is a further aspect of the present disclosure to provide a method of installing the door module within the cavity of a vehicle door that embodies the inventive concepts set forth in the following illustrations.

It is a further aspect to provide a door module that facilitates assembly of a carrier having an outside handle assembly coupled thereto to a door panel structure of a door assembly.

In accordance with these and other aspects of the disclosure, a door module is provided including, a carrier module, a handle chassis, and an arm operably coupled to the carrier module, wherein the arm extends outwardly from the carrier module. The handle chassis is operably coupled to the arm for movement relative to the carrier module to facilitate assembly of the carrier module to the door module.

In accordance with another aspect of the disclosure, a main body is connected to the carrier module, wherein the arm is connected to the main body. The main body can be formed as a monolithic piece of material with the arm or as a separate piece of material from the arm.

In accordance with another aspect of the disclosure, the arm is cantilevered from the main body, with the arm being flexible to allow the handle chassis to move toward the main body and the carrier module along a first axis and away from the main body and the carrier module along the first axis.

In accordance with another aspect of the disclosure, the arm extends to a free end, with the handle assembly being operably coupled to the free end for movement along a second axis, the second axis extending in inclined relation to the first axis.

In accordance with another aspect of the disclosure, the second axis extends generally transversely to the first axis.

In accordance with another aspect of the disclosure, a handle mount body is connected to the free end of the arm, with the handle chassis being connected to the handle mount body.

In accordance with another aspect of the disclosure, the handle chassis is fixed against movement relative to the handle mount body.

In accordance with another aspect of the disclosure, the handle mount body is configured to move relative to the arm along the second axis to facilitate locating the handle chassis relative to an outer panel of the door module during assembly.

In accordance with another aspect of the disclosure, the handle mount body has at least one of a projection and a slot and the arm has at least one of the other of the projection and the slot, the projection of one of the handle mount body and/or the arm being received for sliding movement in the slot of the other of the handle mount body and/or the arm along the second axis.

In accordance with another aspect of the disclosure, the arm has a first portion extending outwardly from the main body and a second portion extending in inclined relation from the first portion to the free end, such that the second portion is laterally spaced from the main body and extends generally parallel to the main body.

In accordance with another aspect of the disclosure, the arm first portion extends generally transversely from the main body and the second portion extends generally transversely from the first portion to the free end.

In accordance with another aspect of the disclosure, the second portion is generally planar and generally L-shaped as viewed looking transversely to the plane along which the second portion extends.

In accordance with another aspect of the disclosure, the carrier module can be provided having an outer periphery configured for attachment to an inner panel of a door panel structure of a motor vehicle.

In accordance with another aspect of the disclosure, the carrier module can be configured to close off an opening in the inner panel.

In accordance with another aspect of the disclosure, a presenter assembly for a door module of a door panel structure of a motor vehicle is provided. The presenter assembly includes a main body configured for attachment to a carrier module the door module. An arm extends outwardly from the main body, and a handle chassis is operably coupled to the arm. The handle chassis is moveable relative to the main body to facilitate assembly and enhance functionality in use.

In accordance with another aspect of the disclosure, the arm of the presenter assembly is cantilevered from the main body to enhance flexibility of the arm, thereby allowing the handle chassis to move toward the main body along a first axis during initial stages of assembly to a door structure and away from the main body along the first axis during completion of assembly.

In accordance with another aspect of the disclosure, the arm of the presenter assembly extends to a free end, wherein the handle chassis is operably coupled to the free end for movement along a second axis, wherein the second axis extends generally transversely to the first axis, thereby providing multiple degrees of freedom for adjustment of the handle chassis during assembly.

In accordance with another aspect of the disclosure, the presenter assembly further includes a handle mount body connected to the free end of the arm, the handle chassis being connected to the handle mount body.

In accordance with another aspect of the disclosure, the handle chassis of the presenter assembly is fixed against movement relative to the handle mount body.

In accordance with another aspect of the disclosure, the handle mount body of the presenter assembly is configured to move relative to the arm along the second axis.

In accordance with another aspect of the disclosure, the handle mount body of the presenter assembly has at least one of a projection and a slot and the arm has at least one of the other of the projection and the slot, the projection of at least one of the handle and/or arm being received for sliding movement in the slot of the other of at least one of the handle and/or arm for movement along the second axis.

In accordance with another aspect of the disclosure, the arm of the presenter assembly has a first portion extending outwardly from the main body and a second portion extending in inclined relation from the first portion to the free end.

In accordance with another aspect of the disclosure, the arm first portion extends generally transversely from the main body and the second portion extends generally transversely from the first portion to the free end.

In accordance with another aspect of the disclosure, the second portion of the presenter assembly arm extends along a plane, with the second portion being generally L-shaped, as viewed looking along an axis extending generally transversely to the plane along which the arm extends.

In accordance with another aspect of the disclosure, a method of installing a door module within a cavity of a vehicle door is provided, wherein the door module has an expanded state and a collapsed state. The method includes the following steps: inserting the door module into the cavity of the vehicle door, and during the inserting, causing the door module to transition from the expanded state to the collapsed state through abutting contact of the door module with the vehicle door. Further, aligning the door module into a final assembled position relative to the vehicle door, whereat the door module is automatically caused to expand from the collapsed state to the expanded state via an internal spring bias within the door module.

In accordance with another aspect of the disclosure, the method further includes recognizing that the door module is not in the intended final assembly position until the door module transitions from the expanded state to the collapsed state. Accordingly, the assembler has a direct visual and tactile indicator that the position of the door module is not correct until the door module returns from the collapsed state to the expanded state.

In accordance with another aspect of the disclosure, the method further includes recognizing that the door module is in the intended final assembly position when the door module automatically transitions from the expanded state to the collapsed state under the force of the internal spring bias.

In accordance with another aspect of the disclosure, the method further includes automatically causing a handle chassis of the door module to snap into an opening of an outer panel of the vehicle door as the door module expands from the collapsed state to the expanded state.

In accordance with another aspect of the disclosure, a door module for mounting within a cavity of a vehicle door includes a carrier module, where the carrier module is configured to flex during mounting within the cavity.

In a related aspect, a portion of the carrier module is configured to flex during mounting within the cavity.

In a related aspect, the carrier module would not be able to be inserted into the vehicle cavity without undergoing a flexure.

In a related aspect, the flexure of the carrier module is a result of a portion of the carrier module being forced against an inner surface of the vehicle during assembly of the carrier into the cavity.

In a related aspect, the carrier module is configured to return to an unflexed state after having been installed in the cavity of the vehicle door.

In a related aspect, the portion of the carrier module configured to flex during mounting within the cavity is a protruding arm supporting a vehicle component, such as for example a door handle.

In accordance with another aspect of the disclosure, a vehicle door having an aperture in one of the inner sheet metal and outer sheet metal defining an inner cavity for receiving a portion of a door module for mounting within a cavity of a vehicle door includes a carrier module, where the carrier module is configured to flex during mounting within the cavity and the carrier module is configured to be unflexed when the portion of the door module is aligned with the aperture.

In a related aspect, the carrier module has a living hinge to allow the carrier module to flex.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4B illustrates an inside perspective view of the presenter assembly of FIG. 4;

Figure 12:
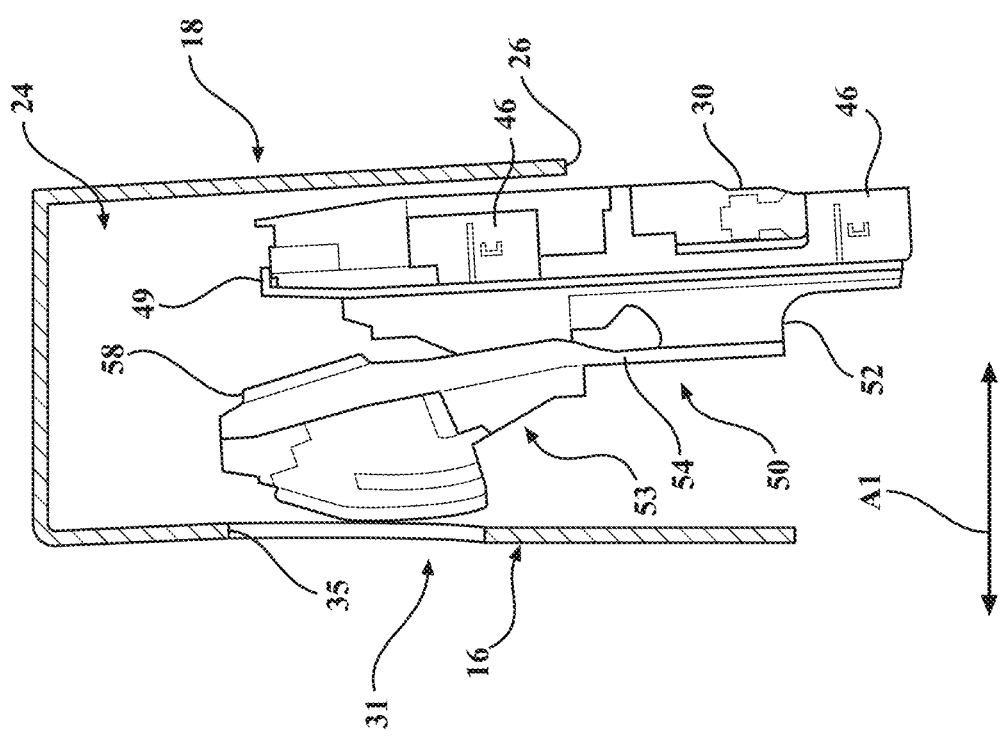
FIG. 12 illustrates a fully assembled stage of assembly of the presenter assembly of the door module into the internal cavity with the handle chassis of the presenter assembly shown in the expanded state.
Figure 13A:
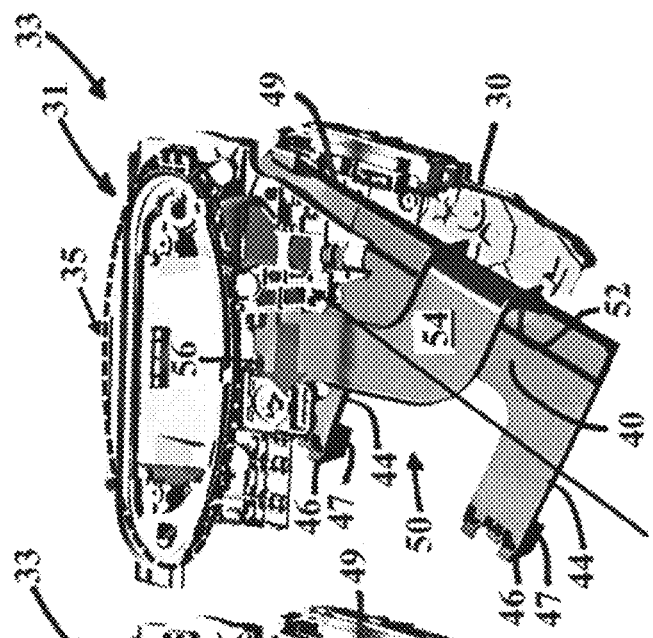
FIG. 13A illustrates an outside side view of the presenter assembly of the door module showing the handle chassis in a position associated with the intermediate stage of assembly of FIG. 10, whereat the handle chassis is misaligned with an opening in an outside panel of the vehicle door configured for receipt of the handle chassis.
Figure 13B:
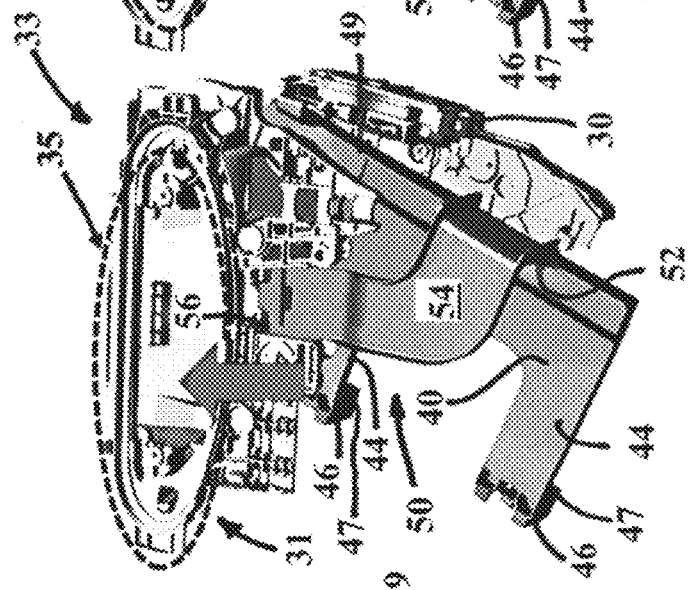
FIG. 13B is a view similar to FIG. 13A showing the handle chassis in a position associated with the advanced intermediate stage of assembly of FIG. 11, whereat the handle chassis is misaligned with the opening in the outside panel of the vehicle door.
Figure 13C:
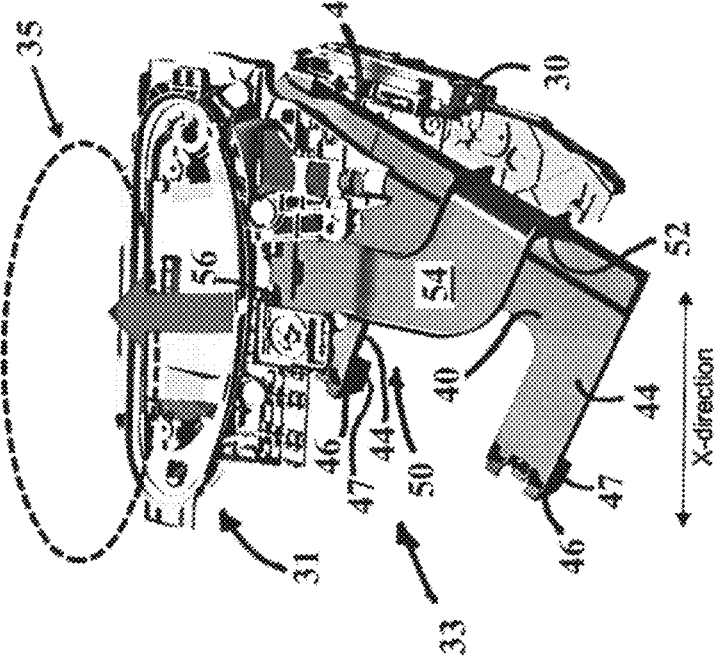
Figure 14:
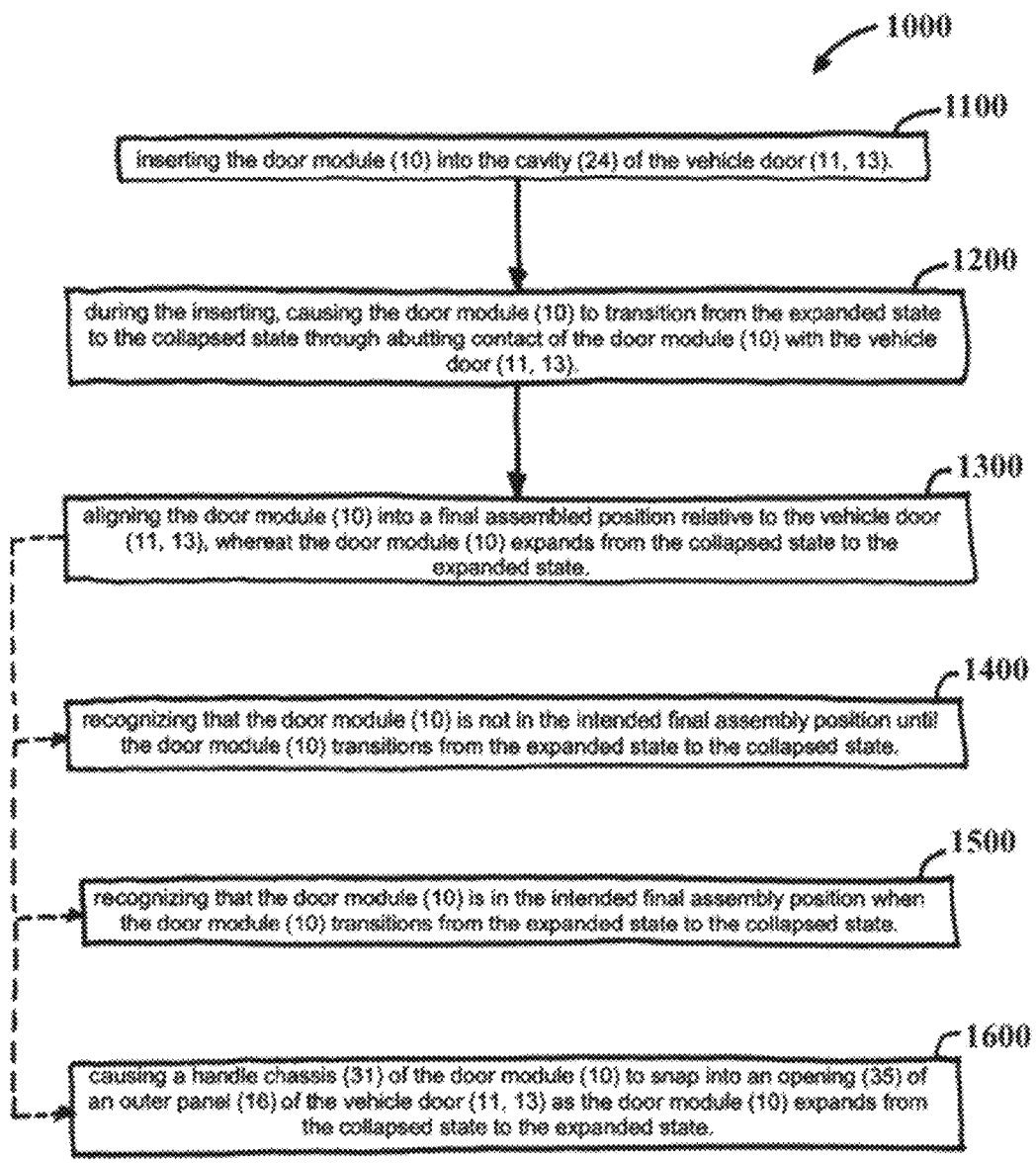

FIG. 13C is a view similar to FIG. 13A showing the handle chassis in a position associated with the fully assembled stage of assembly of FIG. 12, whereat the handle chassis is aligned with the opening in the outside panel of the vehicle door and received therein; and FIG. 14 illustrates a flow diagram of a method of installing a door module having an expanded state and a collapsed state within a cavity of a vehicle door.

Corresponding reference numerals indicate corresponding parts throughout the several views of the drawings.

DETAILED DESCRIPTION OF EXAMPLE EMBODIMENTS

Example embodiments will now be described more fully with reference to the accompanying drawings.

The present disclosure is directed to one or more embodiments of a door module configured for installation with an internal cavity of a vehicle door. The door modules of the present disclosure and methods of installing/assembling such door modules are clearly illustrated in the appended drawings and those skilled in the art will fully comprehend all aspects, features and improvements associated therewith.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
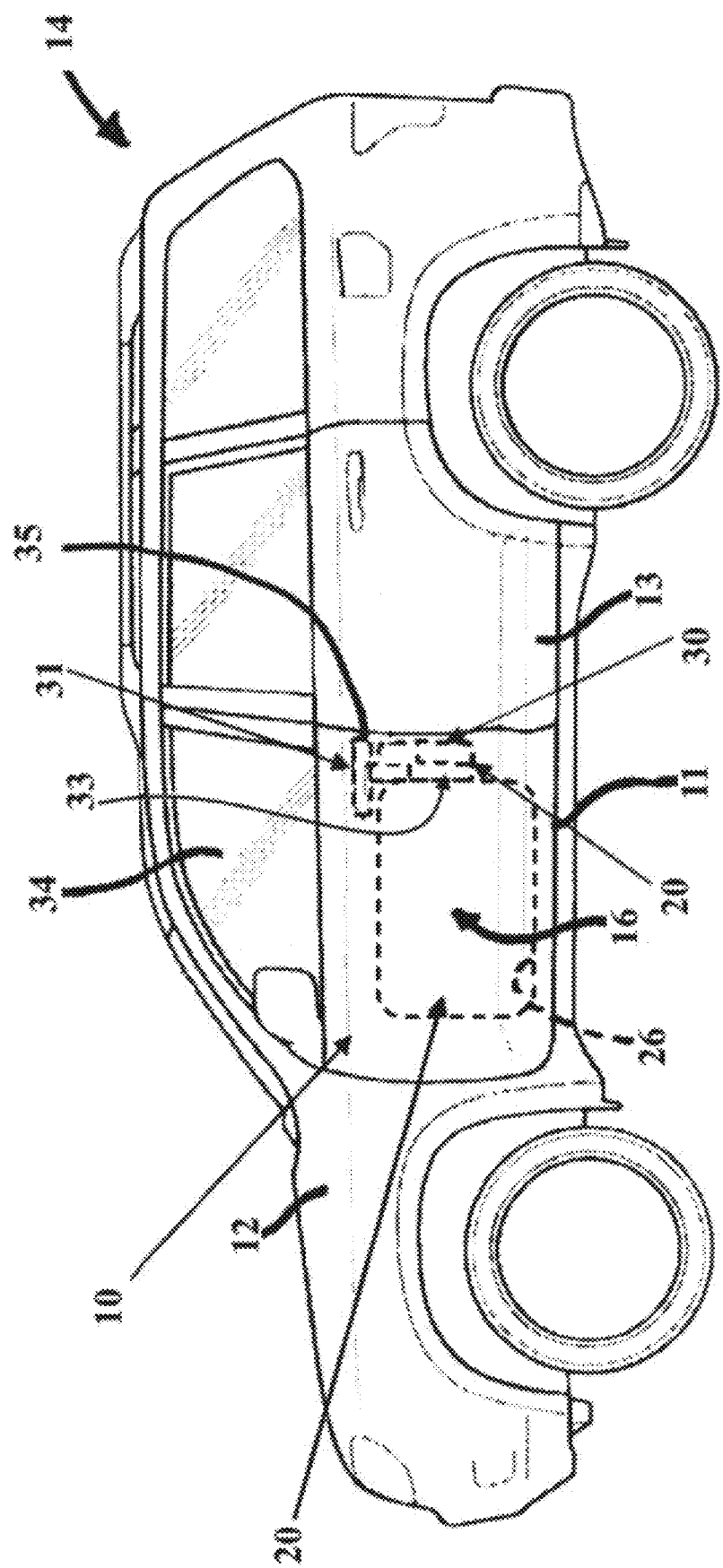
FIG. 1 illustrates a side view of a vehicle equipped with a vehicle door having a door module constructed according to the present disclosure.
Figure 2:
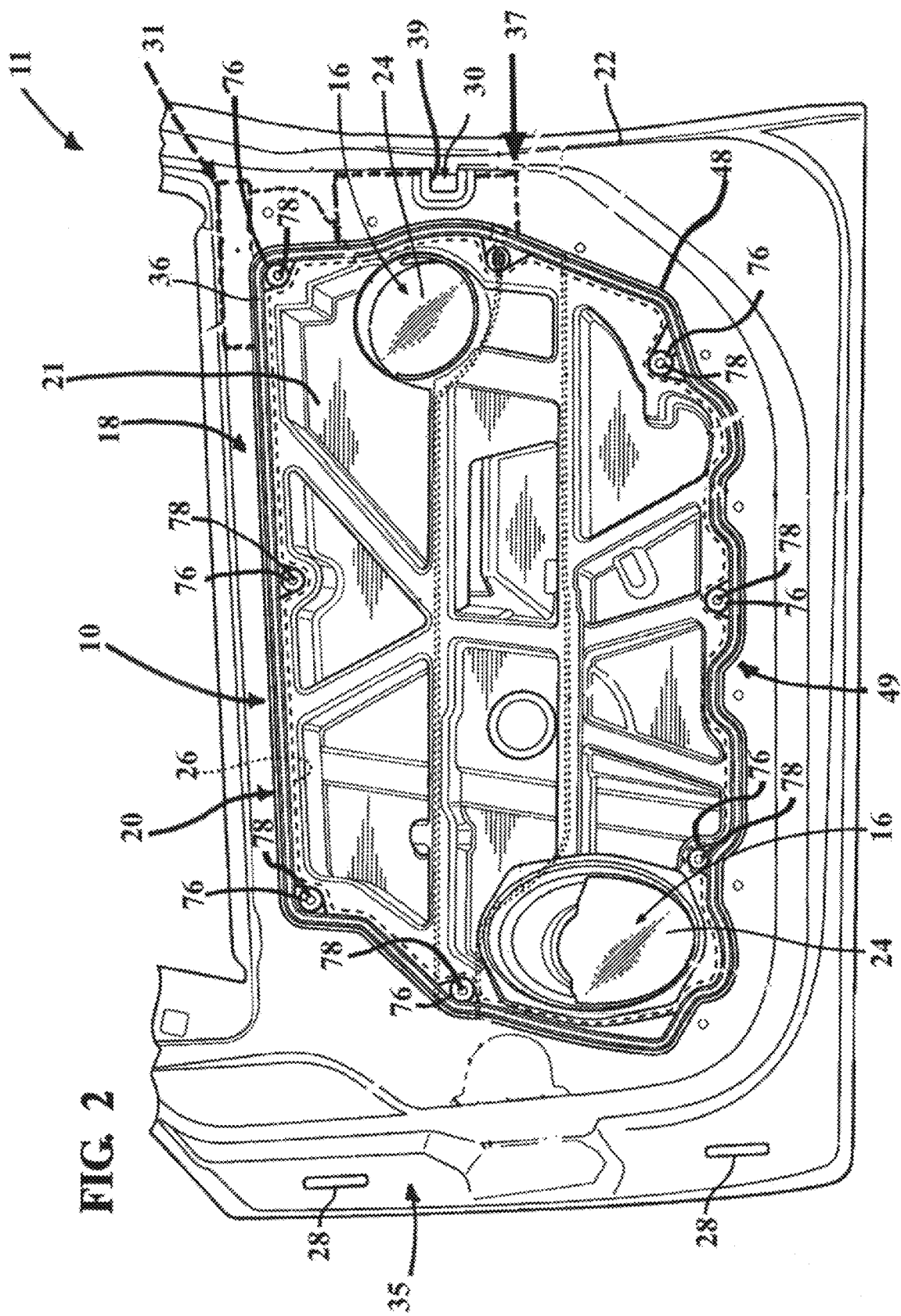
FIG. 2 is an inside plan view of a portion of the vehicle door of the vehicle of FIG. 1 illustrating a door module constructed according to the present disclosure.
Figure 3:
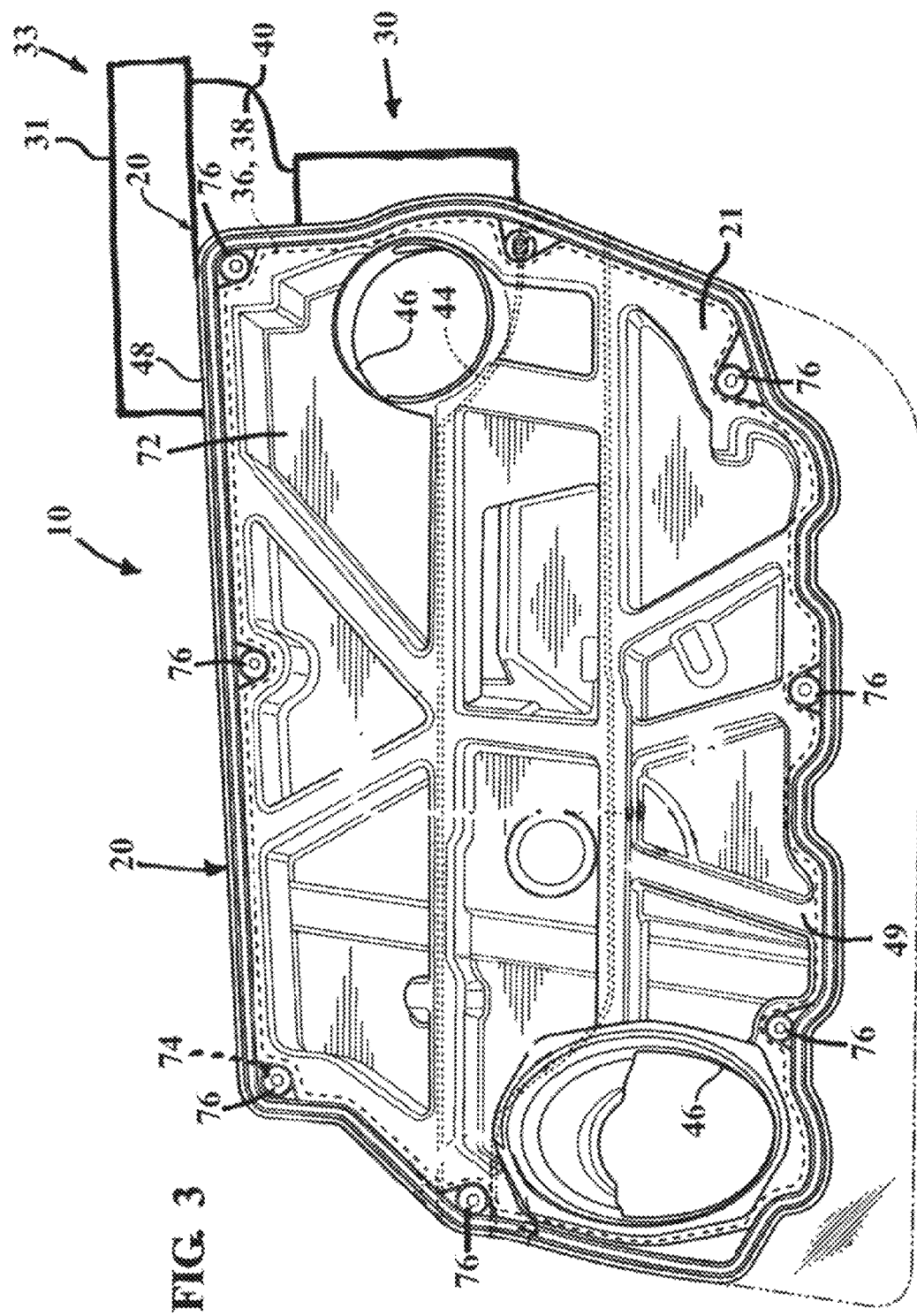
FIG. 3 illustrates an inside plan view of the door module of FIG. 2.
Figures 4, 4A:
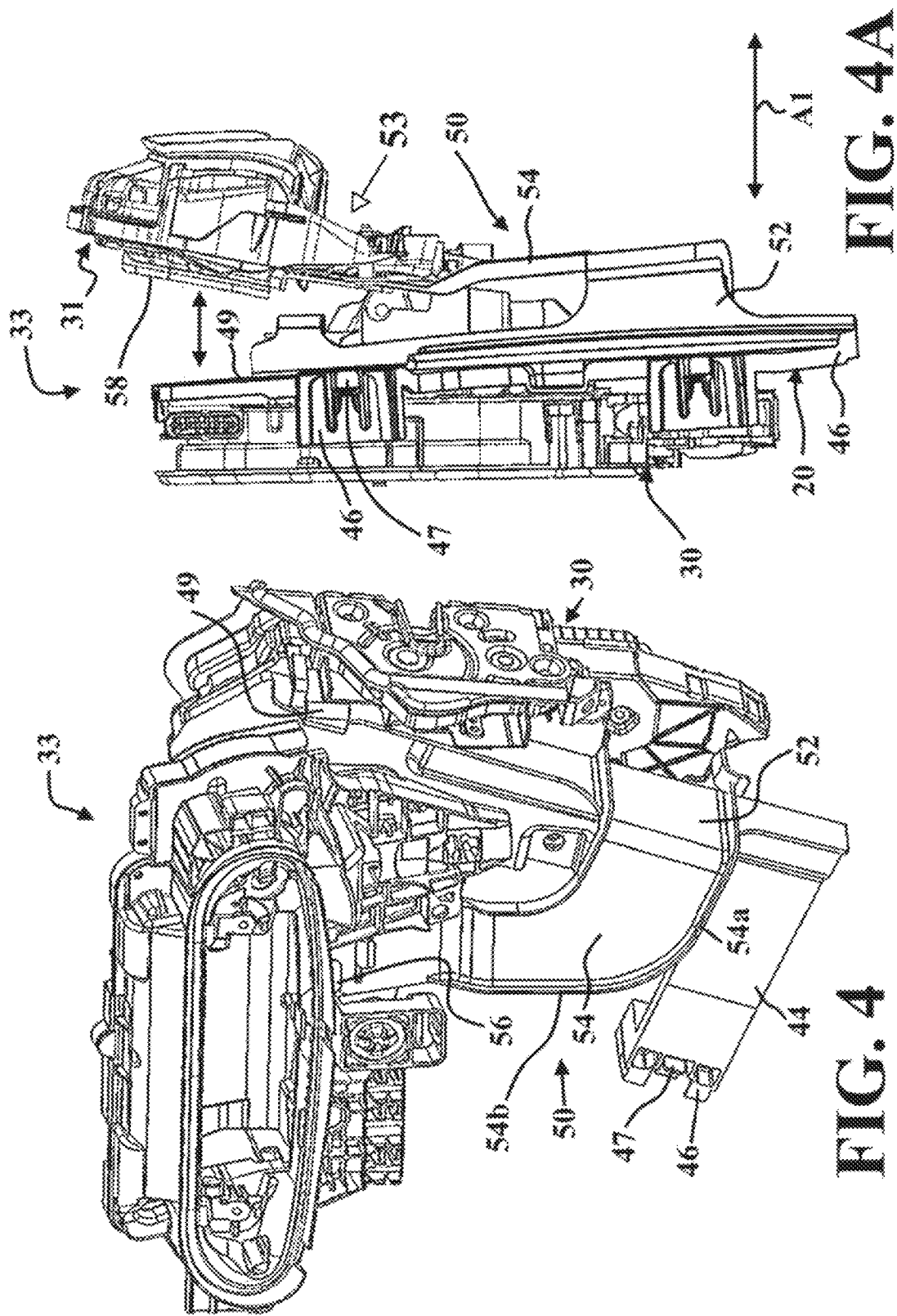
FIG. 4 illustrates an outside plan view of a presenter assembly of the door module of FIG. 2.
FIG. 4A illustrates a side elevation view of the presenter assembly of FIG. 4.
Figure 5:
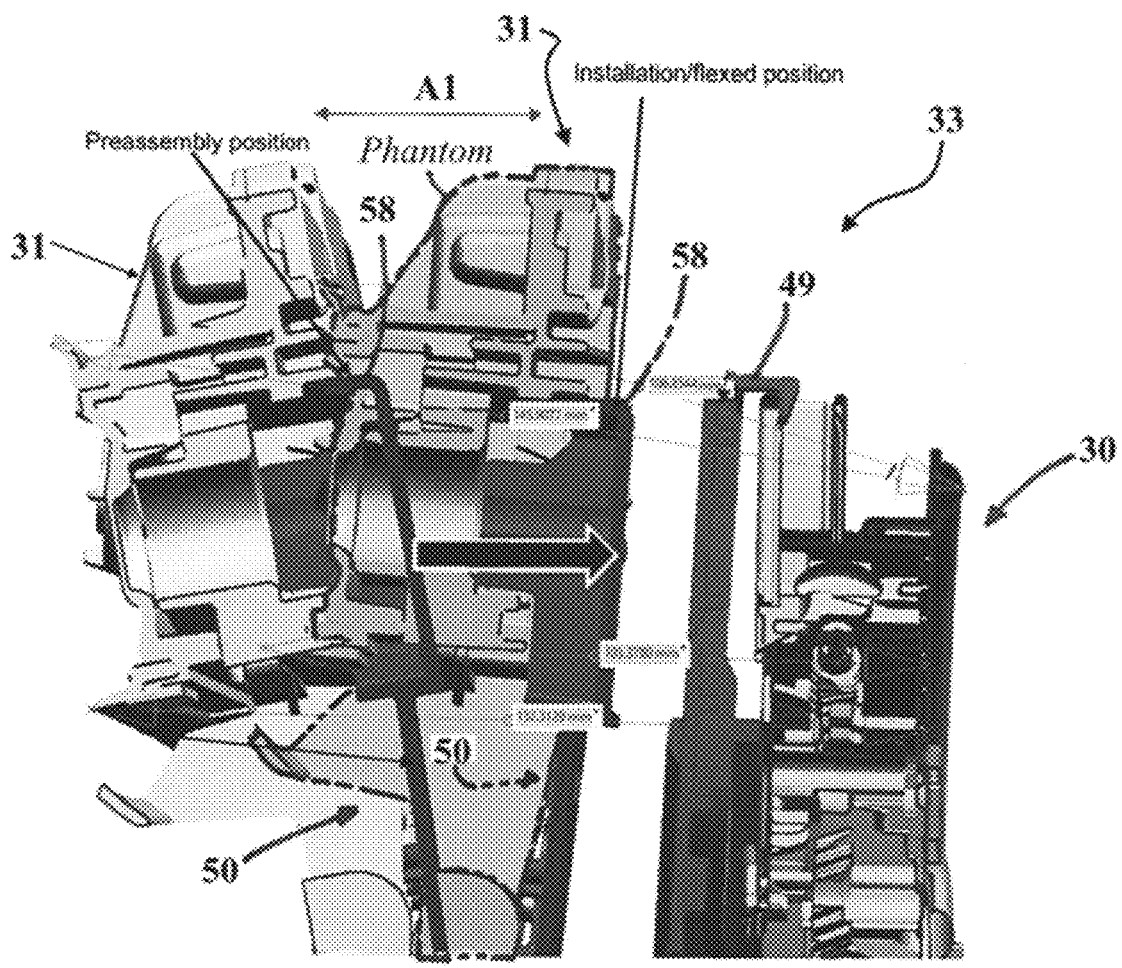
FIG. 5 illustrates a side elevation view of a portion of the presenter assembly of FIG. 4, with a handle chassis of the presenter assembly, shown on the left, in an expanded state associated with a "pre-assembled state" and a "fully assembled state," and on the right, in a collapsed state associated with an "intermediate assembly state"

Reference is made to FIG. 1, which shows a closure panel, illustrated as a front passenger door 11, by way of example and without limitation, having a pre-assembled door module 10 (FIGS. 1-3), with front passenger door 11 being mounted to a vehicle body 12 of a motor vehicle 14. Front passenger door 11 includes an outer panel 16 an inner panel 18 defining an internal door cavity 24 therebetween (FIG. 2). Door module 10 includes a main door module, also referred to as main module, carrier assembly or carrier module 20. Carrier module 20 includes a carrier 21 configured to close and seal off an opening 26 in inner panel 18 against passage of water and debris. Carrier 21 is configured to support various components, including, but not limited to, a latch assembly 30 and an outside handle chassis, also referred to as outside handle housing or assembly 31. The latch assembly 30 and outside handle assembly 31 are provided as unitized components of a unitized mini-module, also referred to as mount body assembly or presenter assembly 33. The presenter assembly 33 is configured to be attached to carrier 21, thereby being fixedly integrated as a component of door module 10. Presenter 44 is an example of a first section of the door module 10. Accordingly, door module 10 can be handled as a single component in assembly, with carrier module 20 and presenter assembly 33 being pre-assembled to one another. It is contemplated herein that presenter assembly 33 can be fixed to carrier module 20 prior to assembling presenter assembly 33 in internal door cavity 24 or after, as desired. In addition to unitizing the handle assembly 31, as illustrated in FIG. 4B, latch assembly 30 and carrier module 20, presenter assembly 33 functions as an anti-theft member by covering any rods and/or cables that enter and exit latch assembly 30. Accordingly, known tools used by vehicle thieves are prevented from actuating the latch assembly 30 to open the vehicle closure panel 11, 13.

The manufacture, assembly, and performance of the vehicle door 11 are enhanced directly as a result of the unitized structure of the door module 10, and in particular, the unitization of latch assembly 30 and outside handle assembly 31 of presenter assembly 33, as well as the unitization of presenter assembly 33 with the carrier module 20. In accordance with an aspect of the disclosure, the presenter assembly 33 provides an ability to easily position the carrier 21 of carrier module 20 in its proper location for reliable, sealed fixation to the inner panel 18, while at the same time providing an ability to move the outside handle assembly 31 along multiple axes relative to the carrier 21, though being coupled thereto, thereby allowing the outside handle assembly 31 to be easily and properly positioned for fixation in an opening 35 in the outer panel 16, while at the same time allowing the latch assembly 30 to be properly located in an opening 39 in a shut face 37 (FIG. 2) of the closure panel 11. It will be appreciated by the skilled artisan that the carrier module 20 and carrier 21 thereof, along with presenter assembly 33, can be incorporated into a rear passenger door 13 or any other closure panel desired.

The outer panel 16 forms at least part of the exterior surface of the door assembly 10. The inner panel 18 provides a structural member for the mounting of one or more trim pieces that form an inner surface of the door assembly 10. Some of the inner panel 18 may itself also form part of the inner surface of the door assembly 10, if desired. The outer and inner panels 16, 18 are connected together to provide a door panel structure 22 that forms the internal door cavity 24 that contains various components of the door assembly 10, including components of the carrier module 20 and the presenter assembly 33. To facilitate assembly of the components into the cavity 24, the inner panel 18 includes opening 26. The opening 26 is sized to allow access to the internal door cavity 24 as necessary and desired for assembly and service of components therein, as is known.

The outer and inner panels 16, 18 may be made from any suitable material or combination of materials. For example, the outer and inner panels 16, 18 may both be made from a suitable metal (e.g. a suitable steel). In another example, the outer panel 16 may be made from a suitable polymeric or composite material (e.g. fiberglass) and the inner panel may be made from a suitable metal, by way of example and without limitation.

A pair of hinges 28 are connected to door panel structure 22 and pivotally mount a front end of door panel structure 22 to the vehicle body 12. Door latch 30 is mounted in the opening 39 of shut face 37 of door panel structure 22 to permit the releasable closure of passenger door 11 against vehicle body 12, as is known. Hinges 28 and door latch 30 act as force transfer members through which forces in passenger door 11 are transmitted to vehicle body 12. Such forces include, for example, side-impact forces from another vehicle or object colliding with the vehicle 14.

Carrier 21 is shown as being configured for sealed mounting to inner panel 18 and to support a plurality of door hardware components, in addition to presenter assembly 33, such as window and door latch components, including a power-operated window regulator having an electric motor-driven cable, pulleys, and lifter plates for moving a window 34 within glass run channels, by way of example and without limitation, as will be understood by one possessing ordinary skill in the vehicle door assembly art.

In accordance with a non-limiting embodiment, carrier 21 can be formed to function both as a fluid (water and moisture) barrier and as a sound barrier, and can be provided as a single-piece panel configured to receive a plurality of the aforementioned powered actuators and door hardware components in integrally formed contoured pockets. The carrier 21 can be adapted to be installed in fixed attachment to a surface of the inner panel 18 facing the passenger compartment of the vehicle 14 upon fixing the various components, such as those discussed above, in the internal door cavity 22. Further, in order to facilitate assembly, including ensuring the carrier 21 is properly located and fixed in sealed relation relative to the inner panel 18, the carrier 21 can be formed including a peripherally extending seal bead 36. The seal bead 36 can be provided as any suitable continuous bead of adhesive material capable of maintaining a fluid-tight seal between the carrier 21 and an outer surface of the inner panel 18, such as butyl, by way of example and without limitation. A selectively removable protective layer 38, sometimes referred to as release paper or release film, and referred to hereafter as release member 38, can be disposed over the seal bead 36 until it is desired to expose the seal bead 36 for bonding with the inner panel 18, thereby protecting the seal bead 36 against unwanted contamination.

Carrier 21 can be formed having a plurality of fastener through openings 74 adjacent an outer periphery 48 and can further include a metal or plastic grommet 76 fixed in each of the plurality of fastener through openings 74. Grommets 76 provide compressive structural support for receipt of fasteners 78 used to fix carrier 21 to inner panel 18, wherein grommets 76 prevent over-compression and tearing of the natural fibrous material.

Presenter assembly 33 includes a main body 40 configured for attachment to carrier 21 of door module 10. Main body 40 is shown as having a generally planar, C-shaped portion, with legs 44 of the C-shaped portion extending to free ends 46 configured to attachment to carrier 21. Free ends 46 are shown as having hook-shaped claws or fingers 47 configured for fixed receipt of the outer periphery 48 of carrier 21. It is to be recognized that any suitable fastening mechanism can be used to fix main body 40 to carrier 21, including mechanical fasteners and/or adhesives, by way of example and without limitation. With main body 40 being generally c-shaped, weight reduction is attained by having a region void of material between legs 44. Main body 40 has a mount extension 49 configured for fixed attachment to latch assembly 30.

Figure 6A:
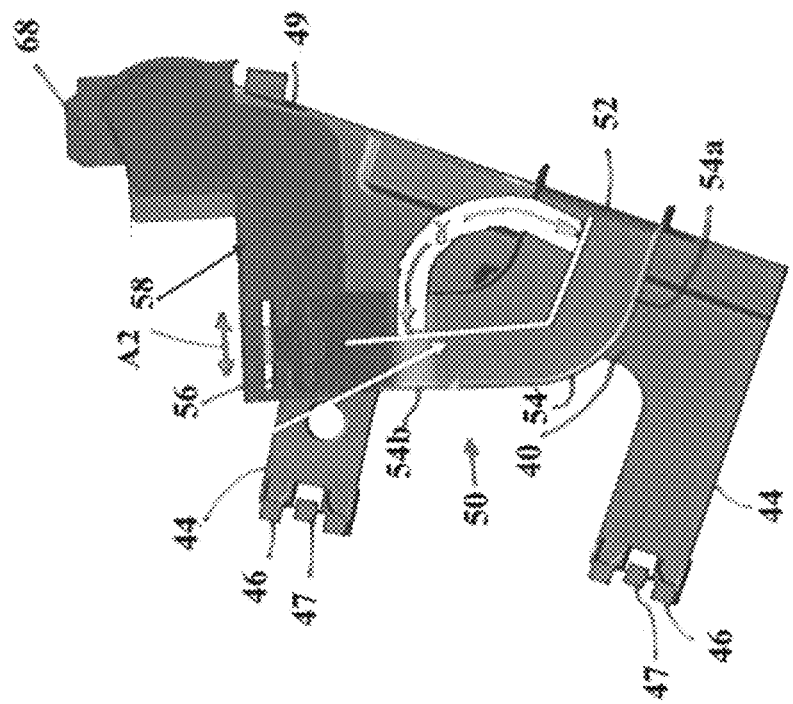
FIG. 6A illustrates an outside side plan view of the presenter assembly of FIG. 6 with the handle chassis disassembled therefrom.
Figure 6:
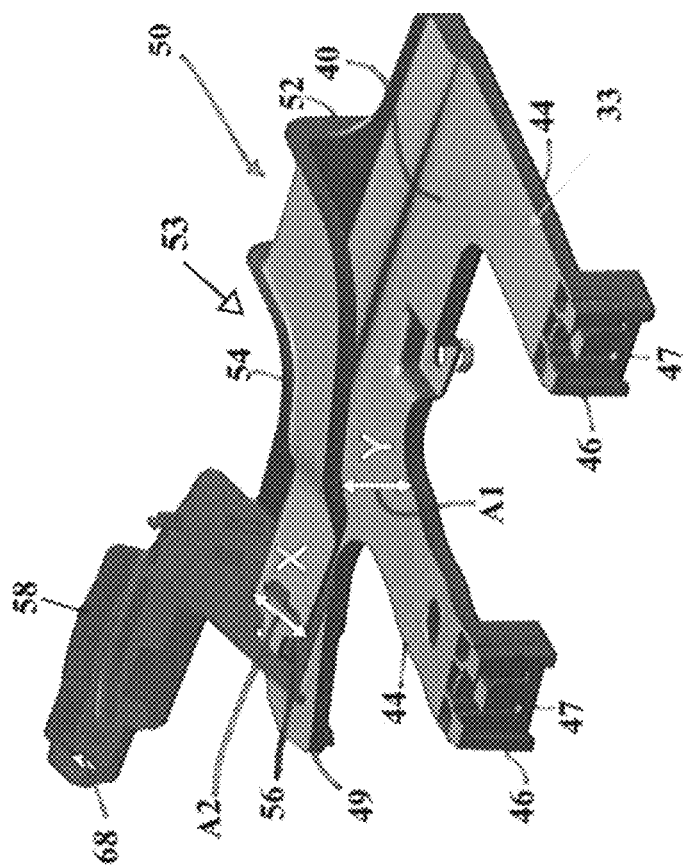
FIG. 6 illustrates an outside perspective view of the presenter assembly with the handle chassis disassembled therefrom.
Figure 7:
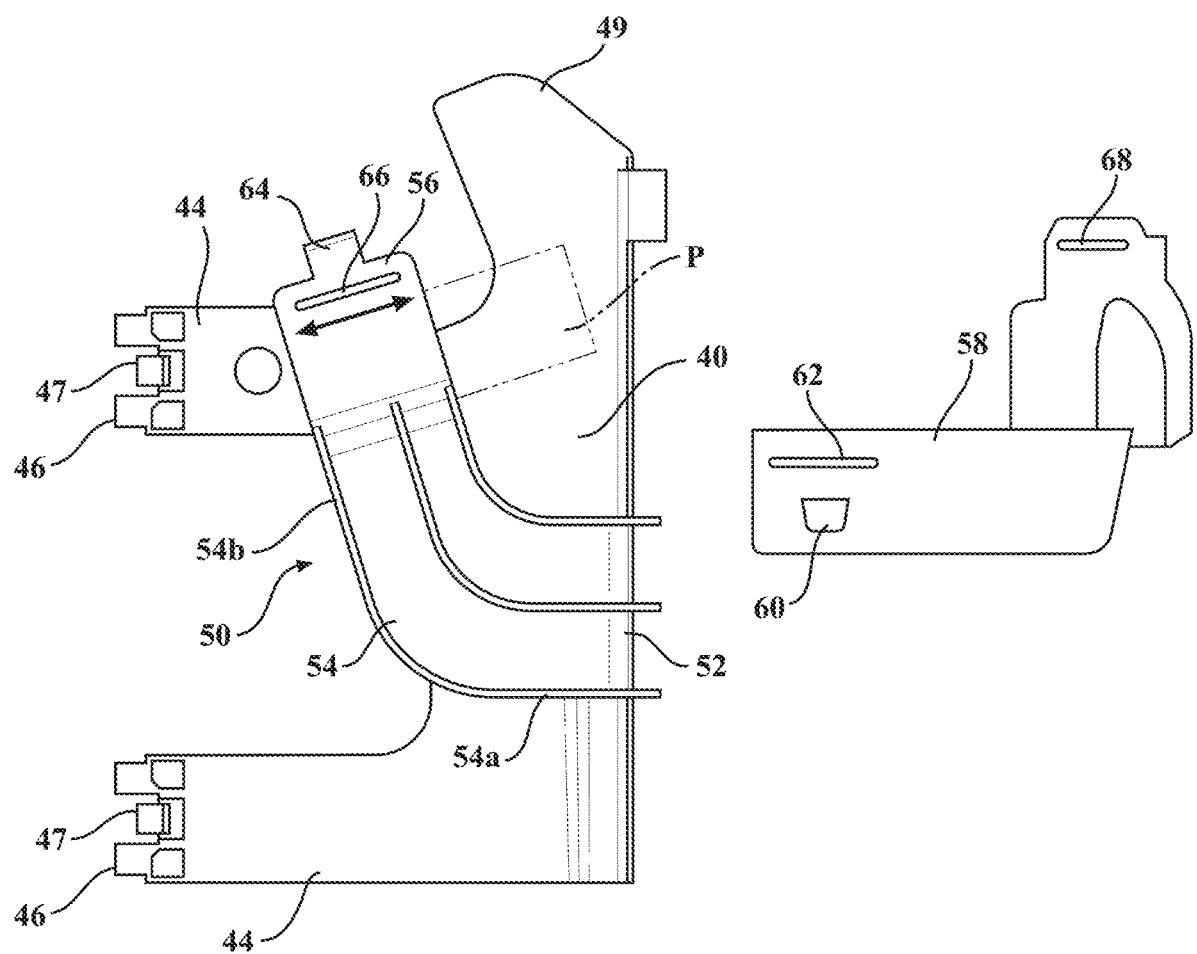
FIG. 7 illustrates a main body of the presenter assembly and the arm extending therefrom, with the handle mount body decoupled from the free end of the arm.

An extension member, also referred to as arm 50, extends outwardly in spaced relation from the main body 40. Arm 50 can be formed as a monolithic piece of material with main body 40, such as via a molding process, by way of example and without limitation. As such, in a non-limiting embodiment, it is contemplated that main body 40 and arm 50 are molded via any suitable polymeric material, though other materials, including metal, are contemplated herein. Arm 50 is cantilevered from the main body 40, with arm 50 being flexible to allow the handle chassis 31 to move toward the main body 40 along a first axis A1 and away from the main body 40 along the first axis A1. Arm 50 has a first portion 52 extending outwardly from the main body 40, and shown, by way of example and without limitation, as extending generally transversely from an outer edge of the main body 40, and a second portion 54 extending in inclined relation from, and shown, by way of example and without limitation, as extending generally transversely from the first portion 52 to a free end 56. As best identified in FIG. 7, second portion 54 extends along a plane P in overlying relation with main body 40 and is generally planar and L-shaped or obliquely shaped as viewed along an axis extending generally transversely to the plane P. The L-shape or oblique shape is defined by a first portion 54a extending from first portion 52 and by a second portion 54b extending from the first portion 54a to the free end 56. Free end 56 is an example of a second section of the door module 10, where arm 50 is configured to act as a living hinge between the first section and the second section of the door module 10. A living hinge may be formed between other first and second sections of door module 10 without limitation. First portion 54a and second portion 54b are inclined within plane P relative to one another having an included angle (a; FIG. 6A) between 90 to 179 degrees, and shown as being between about 90 to 135 degrees, by way of example and without limitation. Although the L-shape or oblique shape enhances flexibility of arm 50 in a compact space, it is contemplated that the second portion 54 could be straight, if desired. Accordingly, being cantilevered and generally L or oblique-shaped enhances the flexibility of arm 50 along the first axis A1 to facilitate assembly, as discussed further below.

Figure 10:
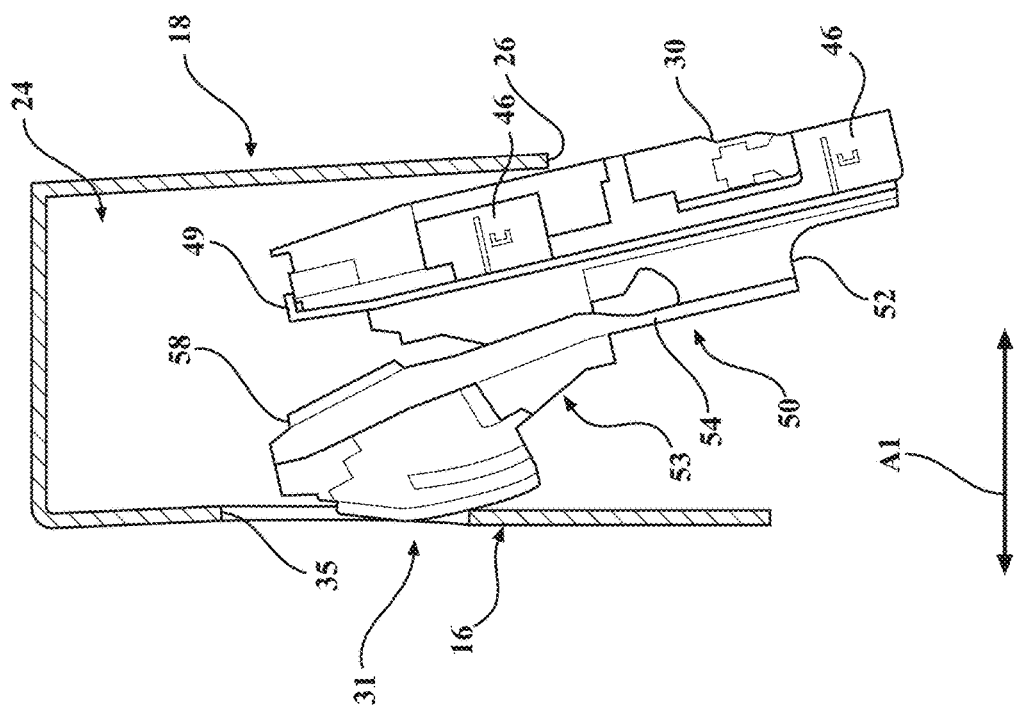
FIG. 10 illustrates an intermediate stage of assembly of the presenter assembly of the door module into the internal cavity with the handle chassis of the presenter assembly shown in the collapsed state.
Figure 9:
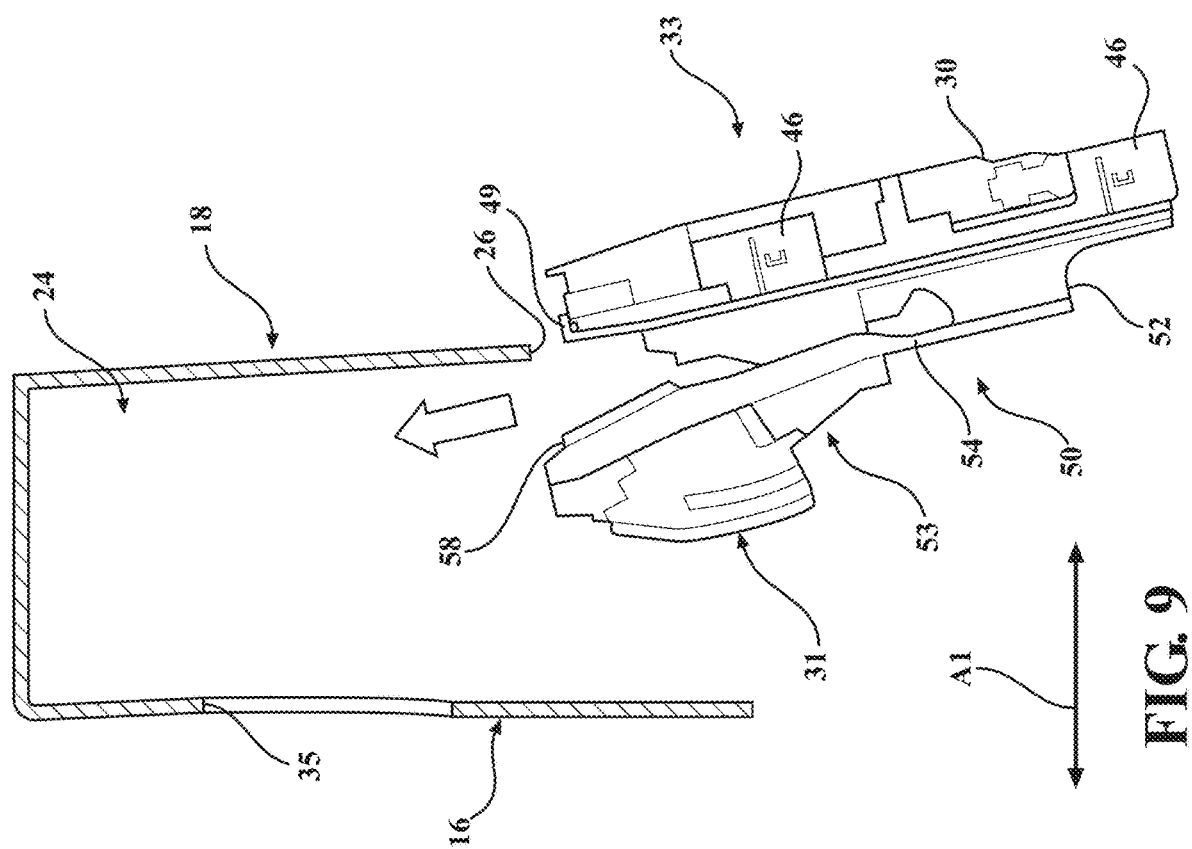
FIG. 9 illustrates an initial stage of assembly of the presenter assembly of the door module into an internal cavity of a door panel structure of the vehicle door with the handle chassis of the presenter assembly shown in the expanded state.
Figure 11:
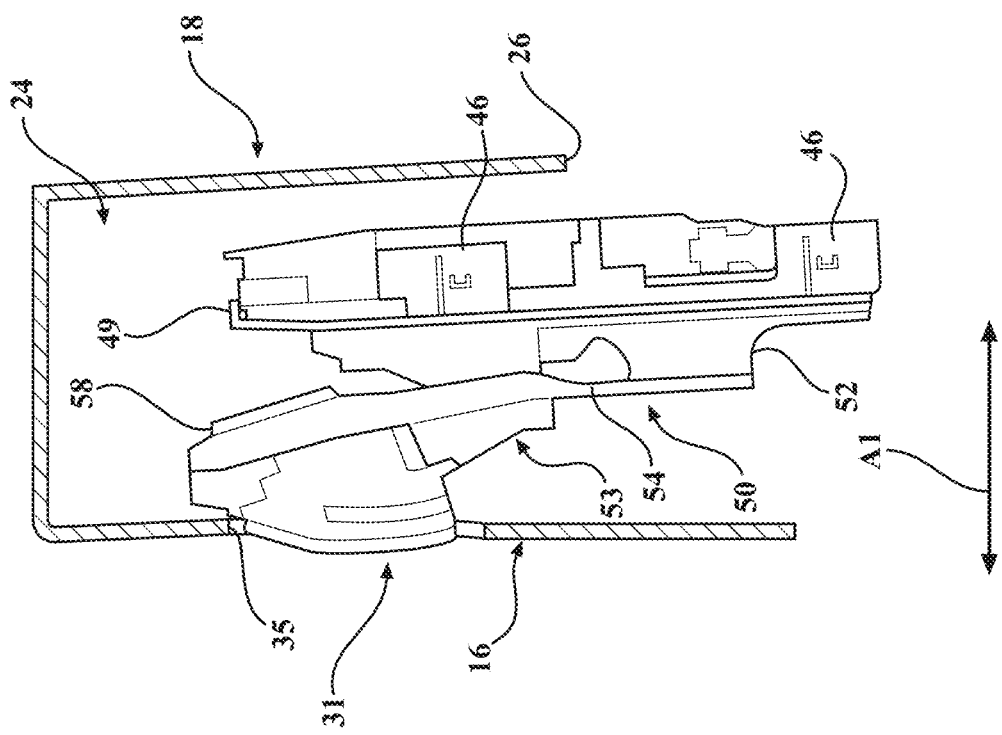
FIG. 11 illustrates an advanced intermediate stage of assembly of the presenter assembly of the door module into the internal cavity with the handle chassis of the presenter assembly shown in the collapsed state.

Handle chassis 31 is operably coupled to the free end 56 of arm 50, such that the handle chassis 31 is moveable relative to the main body 40. Handle chassis 31 is moveable along the first axis A1 in fixed relation with arm 50 and is moveable along a second axis A2 extending in inclined relation to the first axis A1, and in accordance with one aspect of the disclosure, second axis A2 extends generally transversely to the first axis A1. Accordingly, handle chassis 31 is moveable along multiple axes during assembly, thereby facilitating assembly of presenter assembly 33. Handle chassis 31 is able to move toward the main body 40 along the first axis A1 to facilitate fitting presenter assembly 33 between the outer and inner panels 16, 18 during the initial stages of assembly (FIGS. 9-11) and away from the main body 40 along the first axis A1 during the final stage of assembly (FIG. 12) when handle chassis 31 is properly aligned with and received in the opening 35 in outer panel 16, such as in a snap-type fit within opening 35 under an internal spring bias in arm 50.

To facilitate operable attachment of handle chassis 31 to arm 50, a handle mount body 58 is connected to the free end 56 of the arm 50, while the handle chassis 31 is directly connected to the handle mount body 58. Handle chassis 31 is fixed against movement relative to the handle mount body 58, while the handle mount body 58 is configured to move in translation relative to the arm 50 along the second axis A2. Accordingly, the handle chassis 31 is able to move, also referred to as translate, along the second axis A2 relative to arm 50.

Figure 6B:
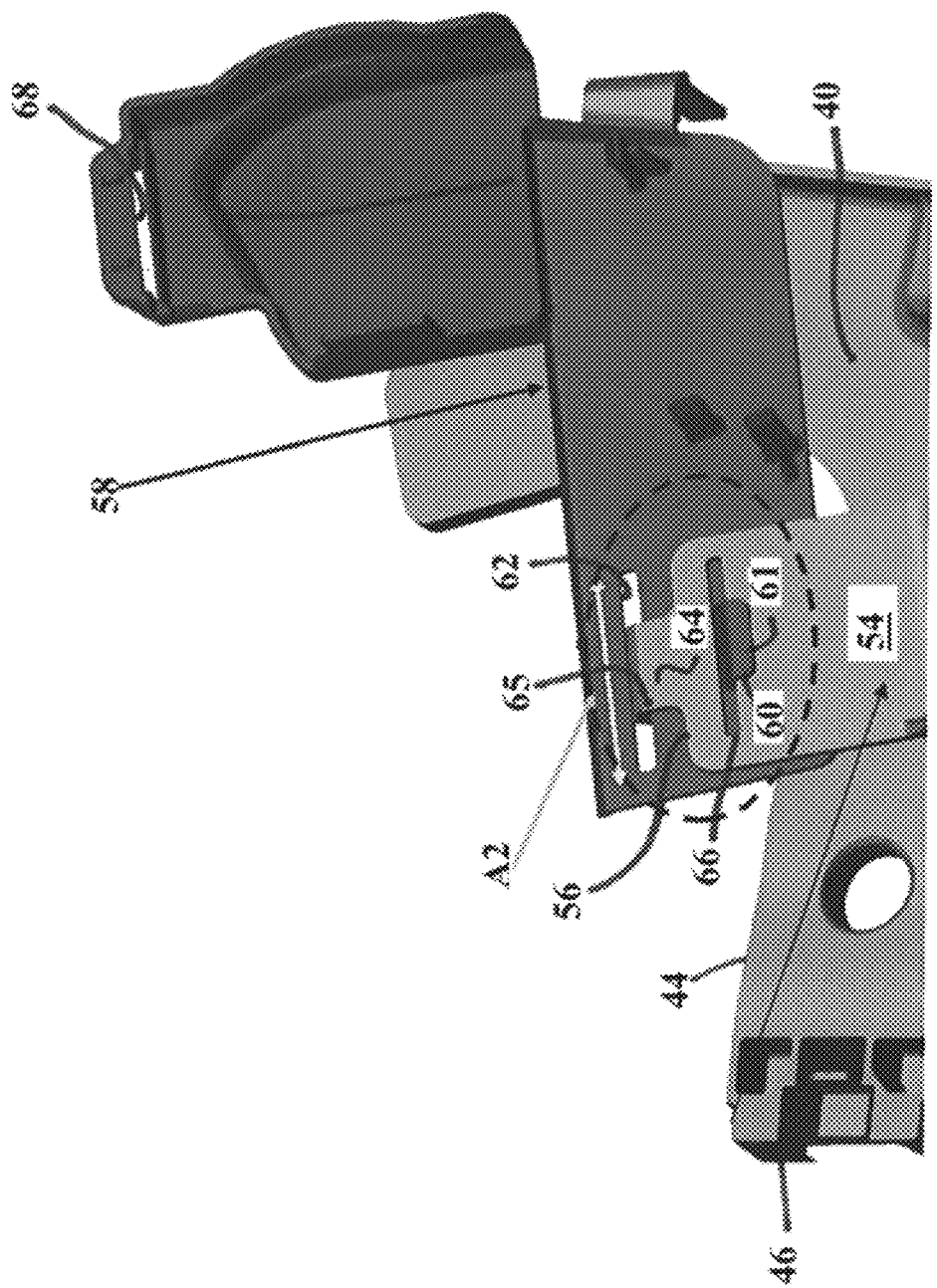
FIG. 6B illustrates an outside plan view of a handle mount body and a free end of an arm of the presenter assembly of FIG. 6, with the handle mount body being configured for adjustment along an axis relative to the free end of the arm.

To establish a relative movement connection between handle mount body 58 and arm 50, handle mount body 58 has at least one of a projection and a slot, and shown as a projection 60 and a slot 62, and the arm 50 has at least one of the other of the projection and the slot, and shown as a projection 64 and a slot 66, wherein the at least one projection and slot is received for sliding, also referred to as translating, movement in the other of the at least one projection and slot along the second axis A2. In the exemplary embodiment illustrated, the projection 60 of handle mount body 58 is received in the slot 66 of arm 50 for sliding movement therein, while the projection 64 of arm 50 is received in the slot 62 of handle mount body 58 for sliding movement therein. As best identified in FIG. 6B, each of the projections 60, 64 are shown as having respective hook-shaped ends 61, 65 to facilitate maintaining the handle mount body 58 in slideably connected relation with arm 50, thereby inhibiting the handle mount body 58 from falling off arm 50.

Figure 8:
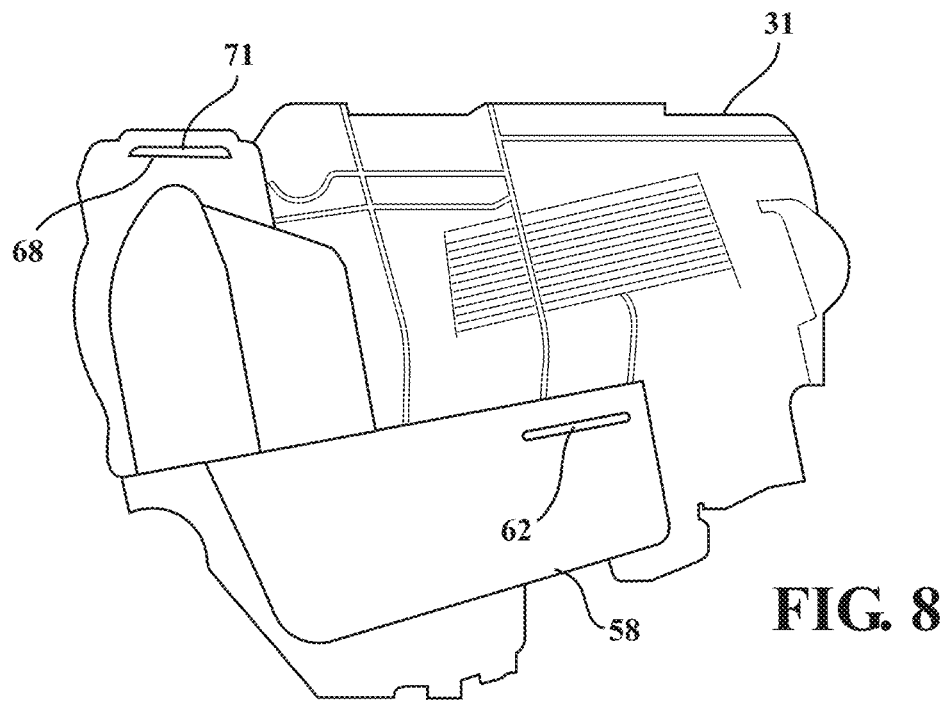
FIG. 8 illustrates a perspective view of the handle mount body with the handle chassis attached thereto.
Figure 8A:
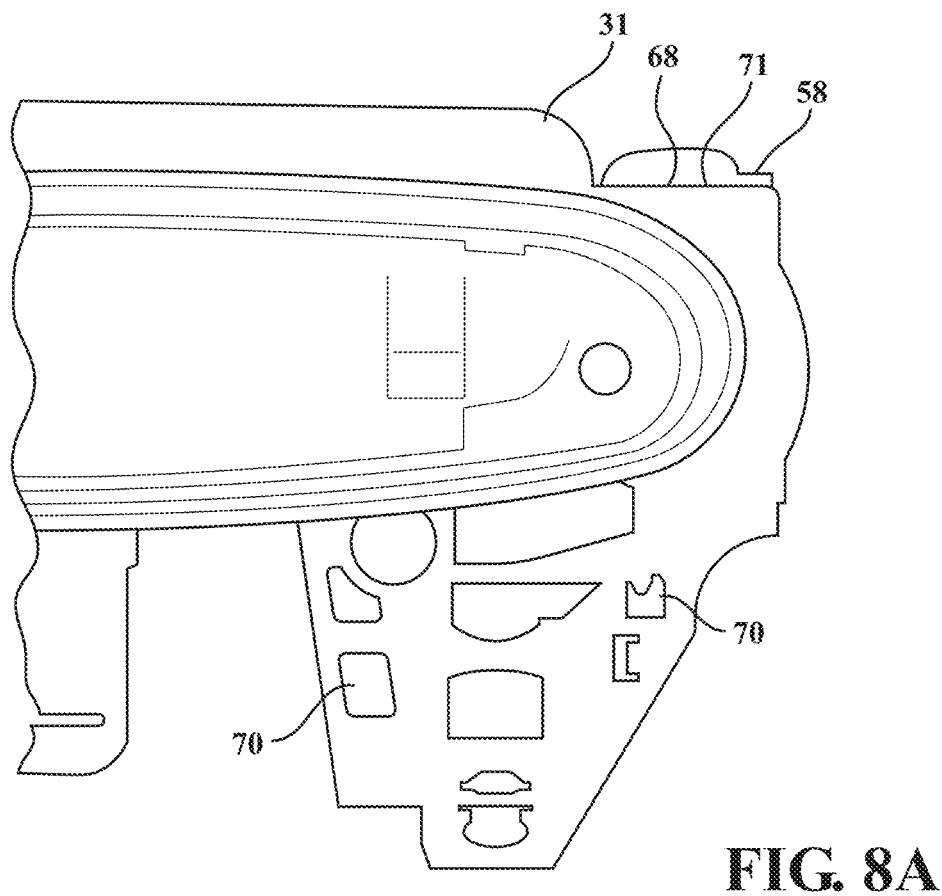
FIG. 8A illustrates a side view of the handle mount body with the handle chassis attached thereto shown from an opposite side of FIG. 8.

To establish a fixed connection between handle mount body 58 and handle chassis 31, any suitable fixation mechanism can be used, including mechanical fasteners and/or adhesives, by way of example and without limitation. In the exemplary embodiment illustrated, as best identified in FIGS. 8 and 8A, handle mount body 58 is shown having a tongue slot 68 and at least one, and shown as a plurality of projections, shown a resilient snap tabs 70, and handle chassis 31 is shown as having a tongue 71 configured for receipt in tongue slot 68 and at least one, and shown as a plurality of openings 72 configured for snapping receipt of snap tabs 70 therein. As such, tongue 71 can be inserted into tongue slot 68 and then snap tabs 70 can be snapped resiliently into openings 72, thereby fixing handle chassis 31 to handle mount body 58.

Figure 7A:
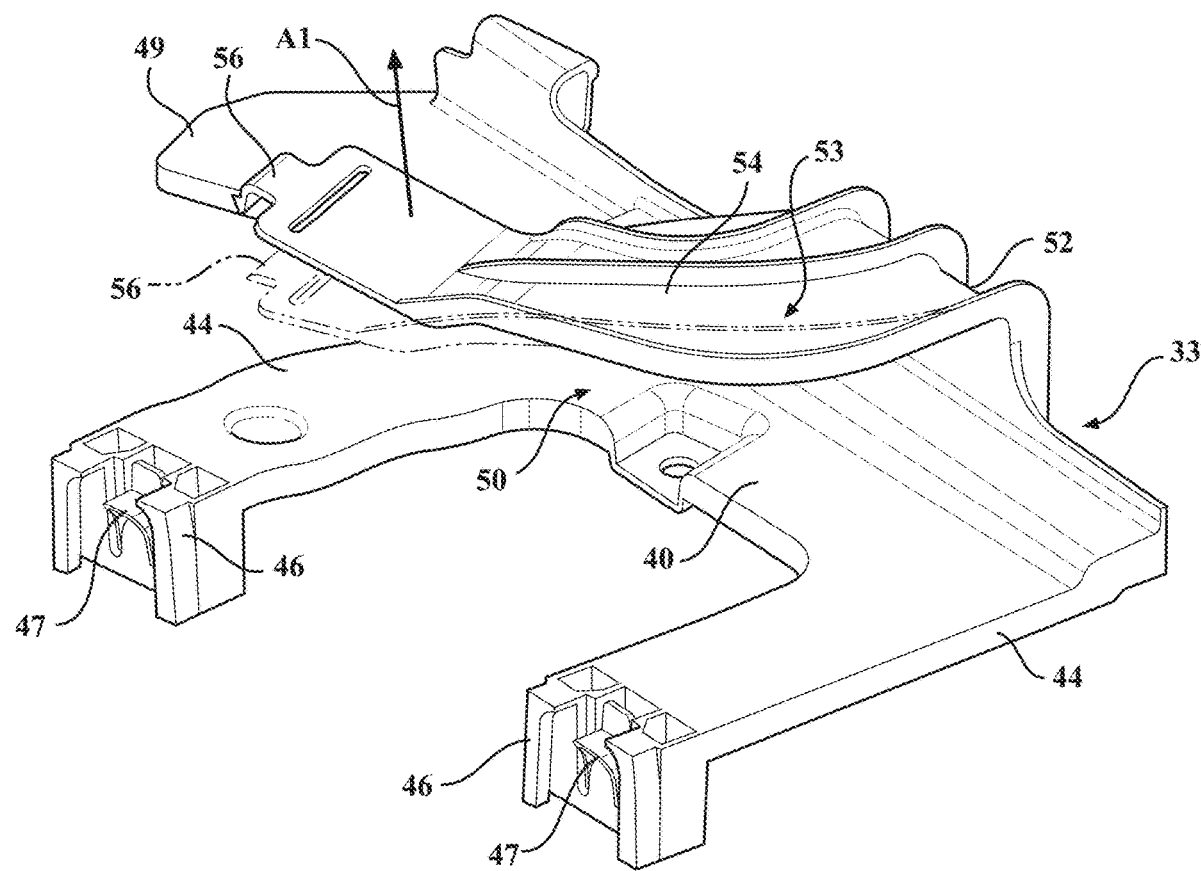
FIG. 7A illustrates a perspective view of the main body and arm of FIG. 7 with the arm shown being deflected along an axis.

In accordance with another aspect of the disclosure, as diagrammed in FIG. 14, a method 1000 of installing a door module 10 within a cavity 24 of a vehicle door 11, 13, wherein the door module 10 has an expanded state (FIGS. 9 and 12) and a collapsed state (FIGS. 10 and 11) is provided. The method 1000 includes a step 1100 of inserting the door module 10 into the cavity 24 of the vehicle door 11, 13, and during the inserting step 1100, causing 1200 the door module 10 to transition from the expanded state to the collapsed state through abutting contact of the door module 10 with at least one of the outer and inner panels 16, 18 of the door panel structure 22 the vehicle door 11, 13. When transitioning to the collapsed state, the handle chassis 31 is caused to move in fixed relation with the arm 50 toward the main body 40 along the first axis A1 via flexing of the arm 50. As shown in FIG. 7A, the majority of flexing can occur at an elbow region where the first portion 54a transitions to the second portion 54a of arm second portion 54,50, though it is to be understood that flexing can occur throughout the entirety of arm. The flexing of the door module 10 can be provided as a result of a living hinge 53 formed in the door module 10. Such a living hinge or integral hinge is formed from the same continuous material as the two sections of the door module 10 the living hinge 53 connects. The living hinge 53 may be configured as a flexure hinge or as a compliant joint which approximately acts due to flexural bending of a part of the door module 10, as would be compared to a hinge connecting two distinct discontinuous pieces of material which do not flex, but rather may pivot relative to each other about a fixed axis of rotation. Thus, the form of relative motion can only be idealized as a rotation. Because of their monolithic arrangement, compliant joints provide numerous approaches for the design of a flexure hinge. The ability of the arm 50 to flex along the first axis A1 allows the presenter assembly 33 of door module 10 to fit between outer and inner panels 16, 18 without causing damage to any components. Further, a step 1300 of aligning the door module 10 into a final assembled position relative to the vehicle door 11, 13, whereat the door module 10 automatically expands from the collapsed state to the expanded state. The aligning can include slidably adjusting the position of the handle chassis 31 along the axis A2 by sliding, also referred to as translating, handle mount body 58 and handle chassis 31 fixed thereto relative to arm 50, as best illustrated in FIGS. 13B and 13C.

In accordance with another aspect, the method 1000 further includes recognizing 1400 that the door module 10 is not in the intended final assembly position until the door module 10 transitions from the expanded state to the collapsed state.

In accordance with another aspect, the method 1000 further includes recognizing 1500 that the door module 10 is in the intended final assembly position when the door module 10 transitions from the expanded state to the collapsed state.

In accordance with another aspect, the method 1000 further includes automatically causing 1600 a handle chassis 31 of the door module 10 to snap into an opening 35 of an outer panel 16 of the vehicle door 11, 13 as the door module 10 expands from the collapsed state to the expanded state. It is to be understood that expansion of the door module 10 to the expanded, fully assembled stated requires the handle chassis 31 to be properly positioned in opening 35, whereat a spring bias within arm 50 causes automatic return of the presenter assembly 33 from the collapses state to the expanded state.

It is to be understood that the presenter assembly 33 can be assembled as discussed above without having the carrier module 20 fixed thereto, if desired, whereupon the carrier module 20 can be fixedly attached to presenter assembly 33 after assembling presenter assembly 33 in the internal cavity 24 of door panel structure 22.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A door module for mounting within a cavity of a vehicle door, comprising:
a carrier module;
a handle chassis;
an arm operably coupled to the carrier module and extending outwardly from the carrier module, the arm being flexible to allow the handle chassis to move toward the carrier module along a first axis and away from the carrier module along the first axis,
wherein the handle chassis is operably coupled to the arm for translation along a second axis relative to the carrier module, the second axis extending in inclined relation to the first axis;
a main body connected to the carrier module, wherein the arm is connected to the main body,
wherein the arm is cantilevered from the main body,
wherein the arm extends to a free end, the handle chassis being operably coupled to the free end for movement along the second axis; and
a handle mount body connected to the free end of the arm, the handle chassis being connected to the handle mount body,
wherein the handle chassis is fixed against movement relative to the handle mount body,
wherein the handle mount body is configured to move relative to the arm along the second axis,
wherein the handle mount body has at least one of a projection and a slot and the arm has at least one of the other of the projection and the slot, the projection being received for sliding movement in the slot along the second axis.

2. The door module of claim 1, wherein the door module has a first section and a second section and a living hinge provided between the first section and the second section to allow the first section to flex relative to the second section during mounting within the vehicle cavity.

3. The door module of claim 1, wherein the second axis extends generally transverse to the first axis.

4. A presenter assembly for a door module of a motor vehicle door panel structure, comprising:
   a main body configured for attachment to a carrier module of the door module;
   an arm extending outwardly from the main body;
   a handle chassis operably coupled to the arm,
   the arm being flexible to allow the handle chassis to move toward the main body along a first axis and away from the main body along the first axis, wherein the handle chassis is moveable relative to the main body along a second axis, the second axis extending in generally transverse relation to the first axis,
   wherein the arm is cantilevered from the main body, and wherein the arm extends to a free end, the handle chassis being operably coupled to the free end; and
   a handle mount body connected to the free end of the arm, the handle chassis being connected to the handle mount body,
   wherein the handle chassis is fixed against movement relative to the handle mount body,
   wherein the handle mount body is configured to move relative to the arm along the second axis, wherein the handle mount body has at least one of a projection and a slot and the arm has at least one of the other of the projection and the slot, the projection being received for sliding movement in the slot along the second axis.

5. The presenter assembly of claim 4, wherein the arm has a first portion extending outwardly from the main body and a second portion extending in inclined relation from the first portion to the free end.

6. The presenter assembly of claim 5, wherein the second portion extends along a plane and is generally planar and L-shaped or oblique-shaped as viewed along an axis extending generally transversely to the plane.

7. A method of installing a door module within a cavity of a vehicle, the door module having an expanded state and a collapsed state comprising the steps of:
   inserting the door module into the cavity of the vehicle door;
   during the inserting, causing the door module to transition along a first axis from the expanded state to the collapsed state through abutting contact of the door module with the vehicle door;
   aligning the door module relative to the vehicle door, whereat the door module expands along the first axis from the collapsed state to the expanded state; and
   moving a handle chassis of the door module in generally transverse relation to the first axis along a second axis, and causing the handle chassis to snap into an opening of an outer panel of the vehicle door,
   wherein the moving step includes sliding the handle chassis of the door module in generally transverse relation to the first axis along the second axis.

8. A presenter assembly for a door module of a motor vehicle door panel structure, comprising:
   a main body configured for attachment to a carrier module of the door module;
   an arm extending outwardly from the main body; and
   a handle chassis operably coupled to the arm,
   the arm being flexible to allow the handle chassis to move toward the main body along a first axis and away from the main body along the first axis, wherein the handle chassis is moveable relative to the main body along a second axis, the second axis extending in generally transverse relation to the first axis, wherein the handle chassis is slidable for translation relative to the main body along the second axis.

\* \* \* \* \*